US011675644B2

United States Patent
Goswami et al.

(10) Patent No.: US 11,675,644 B2
(45) Date of Patent: Jun. 13, 2023

(54) METHOD AND SYSTEM FOR MANAGING NOTIFICATIONS FOR FLAPPING INCIDENTS

(71) Applicant: Oracle International Corporation, Redwood Shores, CA (US)

(72) Inventors: Manas Goswami, San Ramon, CA (US); Ze Tian Ding, Dublin, CA (US); Raghu Hanumanth Reddy Patti, San Bruno, CA (US); Ana Maria Hernandez McCollum, Belmont, CA (US); Mark Charles Ramacher, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/455,090

(22) Filed: Nov. 16, 2021

(65) Prior Publication Data

US 2023/0153187 A1    May 18, 2023

(51) Int. Cl.
*G06F 11/00*      (2006.01)
*G06F 11/07*      (2006.01)

(52) U.S. Cl.
CPC ...... *G06F 11/0769* (2013.01); *G06F 11/0721* (2013.01)

(58) Field of Classification Search
CPC ............ G06F 11/0769; G06F 11/0721; G06F 11/077; G06F 11/02; G06F 11/076; G06F 11/0754
See application file for complete search history.

(56) References Cited

U.S. PATENT DOCUMENTS

2017/0185464 A1* 6/2017 Lipinski .............. G06F 11/0772
2017/0186302 A1* 6/2017 Lipinski ................ H04L 41/069

* cited by examiner

*Primary Examiner* — Katherine Lin
(74) *Attorney, Agent, or Firm* — Invoke

(57) ABSTRACT

Techniques for suppressing notifications are disclosed. An incident may repeatedly flap between various resolved and unresolved states. Furthermore, other incident attributes may flap between various states such as, for example, varying levels of incident severity. Each change in state results in the transmission of a notification. In order to reduce the number of notifications, the system estimates a flapping window for the incident based on the flapping behavior of prior incidents. The system computes a notification suppression window based at least in part on the estimated flapping window. The system suppresses notifications corresponding to changes in incident state that are detected during the notification suppression window. The notification suppression window may be extended in response to extending the estimated flapping window.

8 Claims, 4 Drawing Sheets

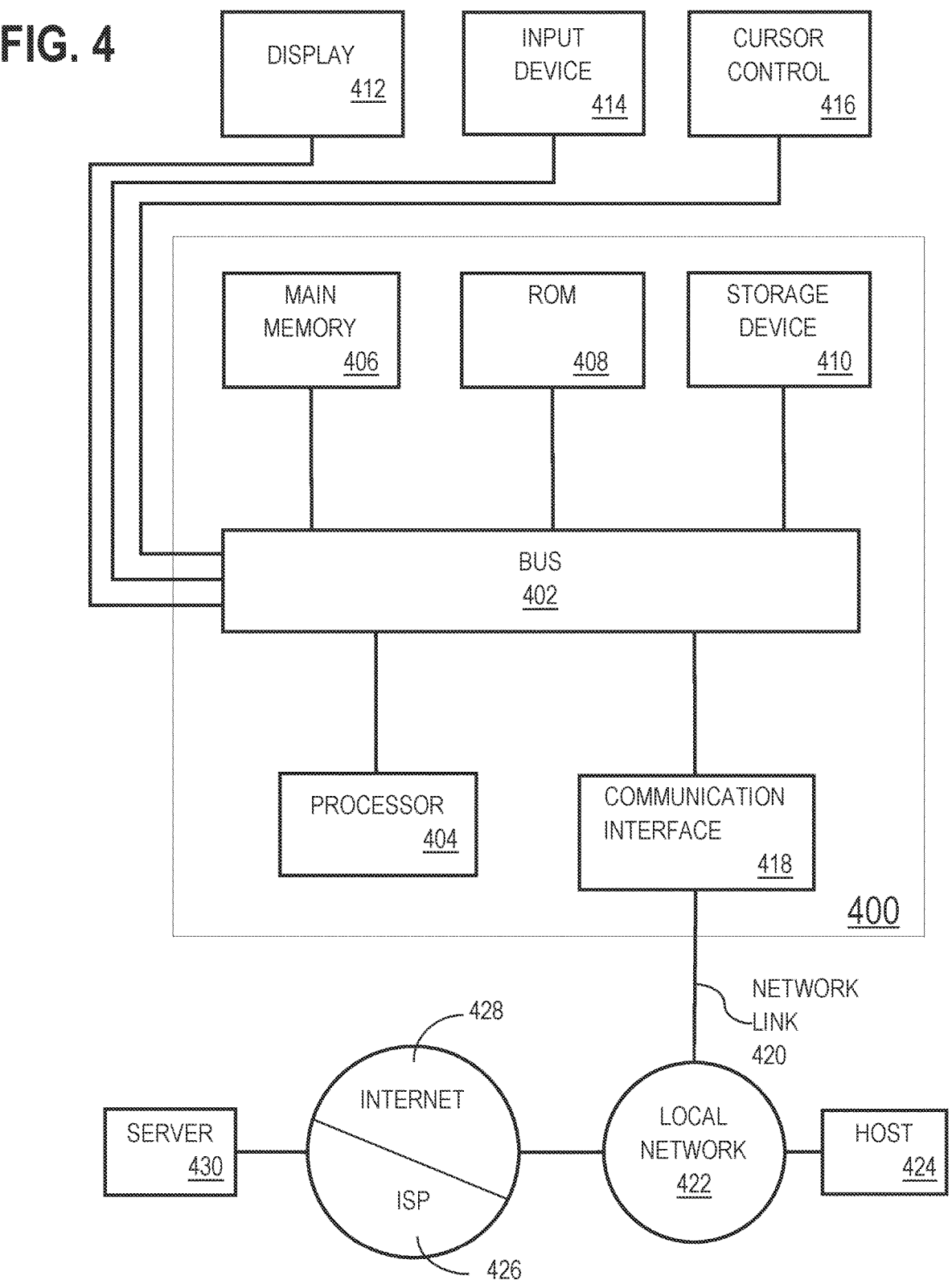

METHOD AND SYSTEM FOR MANAGING NOTIFICATIONS FOR FLAPPING INCIDENTS

TECHNICAL FIELD

The present disclosure relates to incident notification management. In particular, the present disclosure relates to a process for suppressing notifications corresponding to flapping incidents.

BACKGROUND

Modern information technology systems include many different types of components. For example, there may be database systems, network systems, computer applications, and the like. Each such system may be administered and/or monitored by specialized IT professionals.

During normal operation, a computer system may detect behavior/results that are indicative of errors, are not expected, or are simply not desired. These behaviors/results are referred to herein as "incidents". The detection, resolution, or other status change associated with incidents are referred to herein as events. As an example, an event may correspond to detection of a process running slow, a process stalling, or a process resuming normal operation. Each event reporting the status of an incident may trigger a notification. In some cases, an incident repeatedly flaps (i.e., switches) between different incident states resulting in the generation of an event and a corresponding notification each time the incident state is modified. In an example, an incident in a flapping state may repeatedly flap between (a) an unresolved state requiring administrator attention and (b) a resolved state which does not require administrator attention. In another example, the incident in a flapping state may repeatedly flap between different levels of severity such as critical, warning, etc. The continued back and forth between incident states triggers a multitude of corresponding notifications.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 shows a block diagram that illustrates a computer system in accordance with one or more embodiments.

DETAILED DESCRIPTION

Figure 1:
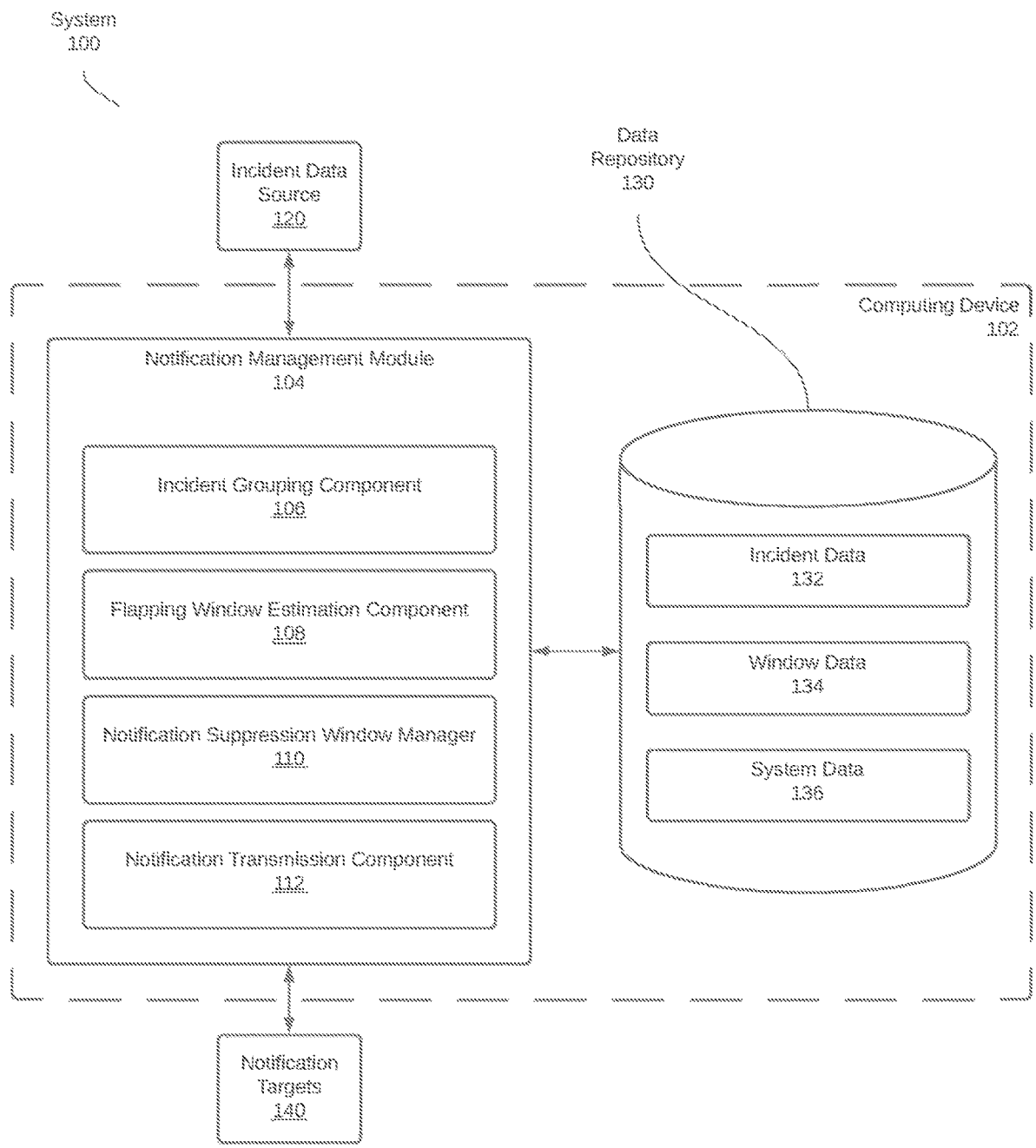
FIG. 1 illustrates an example system for managing flapping incident notifications, in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present invention.

1. GENERAL OVERVIEW
2. NOTIFICATION MANAGEMENT SYSTEM
3. MANAGING FLAPPING INCIDENT NOTIFICATIONS
4. MISCELLANEOUS; EXTENSIONS
5. HARDWARE OVERVIEW

1. General Overview

One or more embodiments estimate a flapping window for an incident during which the incident is likely to flap between different incident states (for example, an unresolved state and a resolved state). The system may compute the estimated flapping window based on historical data associated with similar, prior incidents. The system groups prior incidents based on corresponding incident attributes. Examples of incident attributes may include, but are not limited to, a type of the incident, the type of resources affected by the incident, and the cause of the incident. The system then analyzes the historical data (e.g., status update events) corresponding to a group of incidents to identify periods of time during which the incidents repeatedly flapped between different incident states. Based on the flapping of the prior incidents between different states, the system estimates a period of time during which another similar incident is likely to flap between different incident states. The estimated period of time during which the incident is likely to flap is referred to herein as an estimated flapping window. The estimated flapping window may be defined with respect to an initial event and/or one or more other events associated with the incident. In an example, an estimated flapping window may be defined as the first 10 minutes immediately following a first detection of an unresolved state of the incident. The system records an estimated flapping window beginning from a current time corresponding to the first detection of the unresolved state of the incident and ending ten minutes subsequent to the current time.

In an embodiment, prior incidents may be partitioned into clusters/groups based on similarities between corresponding flapping periods. The similarities may include, for example, a similar length of the flapping period with respect to the initial detection of the incident. Once a cluster of incidents is identified, the attributes commonly found across the set of incidents in the cluster is compared to the attributes of a new incident. If the attribute comparison results in determining that a similarity criterion is met, then the flapping periods for the incidents in the cluster may be used to compute an estimated flapping window for the new incident.

The system may extend an estimated flapping window based on a set of events detected during the estimated flapping window. The conditions for extending the estimated flapping window and the duration of the extension may both be determined based on historical data corresponding to the similar, prior incidents. The conditions for extension and the duration of extension may both be determined such that the flapping events of prior incidents would be included in the initial estimated flapping window or in the extensions of the estimated flapping window. Continuing the preceding example, the 10-minute estimated flapping window may be extended by three minutes if a new event indicating the unresolved state is detected in the last two minutes of current estimated flapping window. The system may further define a maximum estimated flapping window size such that the extensions of the estimated flapping window do not extend the estimated flapping window beyond the maximum estimated flapping window size.

One or more embodiments suppress notifications corresponding to an event associated with an incident when the event occurs during an estimated flapping window for the incident. When the system detects events for an incident that are outside of an estimated flapping window, the system allows the issuance of notifications and/or generates the notifications corresponding to the events. When the system detects events for an incident that are within the estimated flapping window, the system suppresses the notifications and/or refrains from generating the notifications. In an alternate example, the notifications may be suppressed for events detected during a notification suppression window that is based on the estimated flapping window for an incident. The notification suppression window may be identical to, shorter than, or longer than the estimated flapping window for the incident.

One or more embodiments described in this Specification and/or recited in the claims may not be included in this General Overview section.

2. Notification Management System

FIG. 1 illustrates a system 100 for managing flapping incident notifications in accordance with one or more embodiments. The system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

As illustrated in FIG. 1, system 100 includes computing device 102 and various subcomponents thereof. System 100 may also include incident data source 120 and one or more notification targets 140.

In an embodiment, computing device 102 includes a data repository 130. A data repository is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site.

A data repository, such as the data repository 130 shown, may be implemented or may execute on the same computing device 102 as the notification management module 104. The data repository 130 may be communicatively coupled to the notification management module 104 via a direct connection or via a network.

The data repository 130 includes incident data 132. Incident data 132 includes information about an incident. An incident, as described above, includes behavior/results that are indicative of errors, are not expected, or are simply not desired. Incidents may correspond to software and/or hardware. Examples of incidents include but are not limited to poor performance of a Central Processing Unit (CPU), a data transmission rate below a threshold value, a dropped network connection, a virus infection, a system vulnerability, a component overheating, an application not starting up, an application crashing, and a computing system freezing up. The detection, resolution, or other status change associated with incidents are referred to herein as events. As an example, different events may correspond to detection of a process running slow, a process stalling, and a process resuming normal operation.

Incident data may include incident attributes, such as the component affected by the incident, an incident date, incident time, event identifiers for each event included in an incident, and the like. Incident data may include event signatures and other event data, event times, inter-event time data, event frequency, specific attributes designated for incident similarity determinations, and the like. In an embodiment, incident data received may include incident-specific data. Examples of incident-specific data include a particular error code issued as a result of an incident. Incident-specific data may include an error message or code that indicates a flapping incident. Incident-specific data can include particular value(s) produced as a result of the incident. Incident-specific data may include notification(s) from another component, application, or user. Incident-specific data may indicate the absence of some expected value, message, or behavior.

In an embodiment, data repository 130 includes window data 134. Window data 134 may include flapping window data and notification suppression window data. Flapping window data may refer to estimated flapping windows for various prior incidents. Notification suppression window data may refer to data for initially set notification suppression windows, notification suppression window extension data, and/or maximum notification suppression window data for one or more prior incidents.

In an embodiment, data repository 130 includes system data 136. System data may refer to target devices, applications, modules, or other components of a system that are affected by incidents such as those described above, particularly incidents that flap between an unresolved state and a resolved state.

Incident data source 120 may correspond to software and/or hardware components that transmit incident data to computing device 102 or, more specifically, to notification management module 104 of computing device 102. Incident data may be pushed by the incident data source to the notification management module 104. Alternatively, or additionally, incident may be pulled by the notification management module 104. Incident data source 120 may include applications/devices on which the incident is detected and/or separate reporting applications/devices that are reporting the incidents on other devices. Incident data source 120 may publish event records that indicate attributes of an incident including any relevant information and/or status associated with an event. The incident data source 120 may publish event records when a change in any incident attribute is detected. As examples, the event records may be published whenever a change in severity level is detected, a change in unresolved/resolved status is detected, a change in responsible entity is detected, a change in root cause is detected etc. Alternatively, or additionally, the incident data source 120 may publish event records periodically as long as an incident has a particular status (e.g., an "unresolved status" that requires administrator review).

Event records (also referred to herein as "events") include detection events corresponding to when the incident is detected. Event records may include resolution events corresponding to when the incident is determined to be resolved, determined to be no longer relevant, or determined to require no further action. If an incident switches repeatedly between an unresolved and resolved state, the incident data source 120 may repeatedly publish corresponding events.

The incident data may identify the times associated with each event. These time values may indicate points in time when events of the incidents indicated an unresolved state or a resolved state. The incident data may also include a total incident time from an incident start time to an incident's final resolution time, i.e., a time after which the incident does not flap back to an unresolved state from a resolved state. The total incident time corresponds to the period of time (e.g., 30 minutes) that includes the occurrence of all events associated with the incident. The incident data may further include the intervening times between events (e.g., 4 minutes between event 1 and event 2, 3 minutes between event 2 and event 3, 7 minutes between event 3 and event 4, etc.).

In another example, a disk space management application that manages space on a hard disk drive may be a source of incident data. When incidents such as "disk full" occur on the hard disk drive, the disk space management application may transmit incident data to notification management module 104 that provides details about the disk full incident. As another example, a thermometer measuring internal temperature for a computing device may provide incident data to notification management module 104, such as when the temperature of the computing device exceeds a threshold value.

In an embodiment, computing device 102 includes a notification management module 104. Notification management module 104 includes hardware and/or software for managing notifications associated with incidents reported by the incident data source 120. As described above, notifications from various incident data sources 120 may be pushed to the notification management module 104 or pulled by the notification management module 104. The notification management module 104 includes an incident grouping component 106, a flapping window estimation component 108, a notification suppression window manager 110, and a notification transmission component 112.

The incident grouping component 106 corresponds to software and/or hardware including functionality to group together similar incidents for the purpose of analysis by the flapping window estimation component 108. A time period during which a set of similar prior incidents flap is generally indicative of flapping windows of other similar incidents. Accordingly, an analysis of flapping events associated with the prior incidents may be useful to estimate a flapping window for a new incident that is similar to the prior incidents.

The incident grouping component 106 identifies similar incidents based on similarities between incident attributes. Examples of incident attributes that are used for grouping may include, but are not limited to, a type of the incident, the type of functionality affected by the incident, the type of resources affected by the incident, and the cause of the incident. The incident grouping component 106 may use any clustering algorithm (such as k-means clustering) to partition incidents into different groups. Accordingly, the incident attributes are used for grouping incidents together for estimating flapping windows for similar, future incidents.

Alternatively, or in addition, prior incidents may be partitioned into clusters/groups based on similarities between corresponding flapping periods. The similarities may include, for example, a similar length of the flapping period with respect to the initial detection of the incident. Once a cluster of incidents is identified, the shared attributes found across most of the incidents in the cluster is compared to the attributes of a new incident. If the attributes meet a similarity threshold, then the flapping periods for the incidents in the cluster may be used to compute an estimated flapping window for the new incident.

The flapping window estimation component 108 corresponds to hardware and/or software including functionality for estimating a flapping window for a new and/or current incident based on the flapping windows of similar, prior incidents. The flapping window estimation component 108 may obtain sets of prior incidents grouped together by the incident grouping component 106. The flapping window estimation component 108 obtains events associated with each prior incident. Based on the events, the flapping window estimation component 108 identifies respective periods of time (i.e., flapping windows) during which the prior incidents were flapping between different incident states. Based on the events and the flapping windows associated with prior incidents, the flapping window estimation component 108 estimates flapping windows for other similar incidents that are occurring now or may occur in the future.

The flapping window estimation component 108 may further determine triggers and configurations for extending a flapping window. In an example, the flapping window estimation component 108 may compute a trigger such that a flapping window is to be extended when an event in the last two minutes of a current estimated flapping window switches an incident state from "resolved" to "unresolved." The window estimation component 108 may further determine that the estimated flapping window is to be extended by two additional minutes.

The flapping window estimation component 108 may determine whether to extend an estimated flapping window based on a frequency with which events are detected for an incident. In an example, if the frequency of events detected in the last three minutes of the estimated flapping window exceeds a threshold value, the estimated flapping window is extended. If the frequency of events detected in the last three minutes of the estimated flapping window does not exceed a threshold value, the estimated flapping window is not extended.

In an embodiment, a machine learning model generates a flapping window estimate for a target incident. The machine learning model may include supervised components and/or unsupervised components. Various types of algorithms may be used, such as linear regression, logistic regression, linear discriminant analysis, classification, and regression trees, naïve bayes, k-nearest neighbors, learning vector quantization, support vector machine, bagging and random forest, boosting, backpropagation, and/or clustering. The machine learning model is trained based on a set of prior incidents, attributes corresponding to the prior incidents, events associated with prior incidents, along with an indication of whether a prior incident was in an unresolved state, or a resolved state based on the event data. The trained model, when applied to the attributes of a target incident, generates a flapping window estimate that would likely represent a time period during which the target incident is likely to alternate between an unresolved state and a resolved state. The machine learning model may be continually updated using actual flapping time data for the target incident, which is used to further train the machine learning model.

In an embodiment, the machine learning model is updated based on user feedback. User feedback may include explicit user feedback that modifies a computation or formula for generating a flapping window estimate. User feedback may include a correction or modification to a flapping window estimate determined by the machine learning model. User feedback may include use of the system by a user that can be used to derive corrections/updates for the machine learning model.

In an embodiment, notification management module 104 includes notification suppression window manager 110. Notification suppression window manager 110 is configured to determine a notification suppression window for an incident. A notification suppression window represents a time period during which notifications for events corresponding to an incident are suppressed. Suppressing a notification may include altogether preventing a notification from being generated. The event is not transmitted to a process that generates the notifications. Alternatively, or additionally, suppressing a notification may include preventing a generated notification from being transmitted by the notification transmission component 112 to an application/component or user that receives notifications from the notification management module 104. Notifications, for events occurring outside of a notification suppression window, are transmitted by the notification transmission component 112 to a notification target 140.

In an embodiment, a notification suppression window manager 110 computes a notification suppression window for notifications, corresponding to events associated with an incident, based on an estimated flapping window for the incident. The notification suppression window may be computed to match the estimated flapping window. The notification suppression window may be computed as a function of the estimated flapping window. As an example, the notification suppression window may be configured to terminate one minute prior to the estimated flapping window, or one minute subsequent to the estimated flapping window. The notification suppression window may be extended when the estimated flapping window is extended.

The notification suppression window may be configured with a maximum duration such that any extensions of the notification suppression window may be not extend the notification suppression window beyond the maximum duration. In an example, the notification suppression window is configured to match and extends with extensions of an estimated flapping window. However, subsequent to duration of the notification suppression window reaching a configured maximum duration, additional extensions of the estimated flapping window do not result in further extensions of the notification suppression window. In some embodiments, notification suppression window manager 110 may be configured to limit the maximum notification suppression window size to a certain multiple of the estimated flapping window (e.g., 4× an estimated flapping window). In another example, notification suppression window manager 110 may be configured to select a certain percentile from a set of flapping times for a particular type of incident. Data for a particular type of incident may indicate a range of flapping times. Notification suppression window manager 110 may sort the range of times in ascending order, select a time that represents a certain percentile or point on the sorted range, such as the $90^{th}$ percentile, and use the selected time as the maximum notification suppression window size.

In an embodiment, the notification suppression window manager 110 extends the notification suppression window based on a status of the incident when the current notification suppression window is terminating. In an example, the notification suppression window may be extended if an incident remains in an unresolved state at the time the notification suppression window is terminating. When the now-extended notification suppression window is terminating, a status check is again performed to determine the status of the incident. If the incident is resolved, then the notification suppression window is not further extended. If the incident is still not resolved, the notification suppression window may again be extended.

In an embodiment, notification management module 104 includes notification transmission component 112. Notification transmission component 112 may be configured to receive notification suppression window data (e.g., from notification suppression window manager 110) and determine whether or not to transmit event notifications for a particular incident. In an embodiment, notification transmission component 112 may receive the notification suppression window data, initiate a suppression timer that is configured to end at the end of the notification suppression window, and suppress notifications for a target incident until the end of the notification suppression window. In an embodiment, notification transmission component 112 may be configured to receive data indicating that an initial notification suppression window has been extended by notification suppression window manager 110. In response, notification transmission component 112 may extend the notification suppression timer accordingly and continue to suppress notifications until the extended notification suppression window terminates. In an embodiment, notification transmission component 112 receives data regarding the maximum notification suppression window size and stops suppressing event notifications when the maximum notification suppression window size is reached, even if notification transmission component 112 receives other data indicating that the target incident is still flapping.

In an embodiment, notification transmission component 112 transmits a first notification for a first event of a target incident before suppressing further notifications for the target incident. For example, notification transmission component 112 may receive incident data for a target incident indicating that the target incident is likely to be an incident that flaps between an unresolved state and a resolved state. Based on the determination that the target incident is likely to be a flapping incident, notification transmission component 112 transmits a notification for the first non-clear event of an incident (e.g., a critical event or warning event, etc.) and then proceeds to suppress further notifications for the incident. In an embodiment, notification transmission component 112 receives data indicating that a target incident is not likely to be a flapping incident. Based on a determination that a target incident is not flapping, notification transmission component 112 may transmit event notifications without referring to any notification suppression window.

In some embodiments, notifications, detected during a notification suppression window, are suppressed by the notification suppression window manager 110 and thereby, never transmitted to the notification transmission component 112. The notification transmission component 112 may be configured transmit all notifications to notification targets 140.

In an embodiment, system 100 includes notification targets 140. Notification targets 140 may refer to computer devices or other components that receive event notifications for incidents, particularly incidents that flap between an unresolved state and a resolved state. For example, notification targets 140 may include a computing device that can display event notifications to a user responsible for addressing incidents that occur on incident data source components 140, shown in FIG. 1. Notification targets 140 may also refer to computer components that are configured to perform actions based on received event notifications. For example, a database application may be configured to initiate a data transfer process from a disk upon receiving an event notification indicating that a disk's storage level exceeds a threshold level. In an embodiment, notification targets 140 may overlap with incident data source 120. A target device affected by an incident may also be a recipient of event notifications for the incident. For example, an IT professional may operate an application server that performs one or more processes and is also configured to display process results to the IT professional. The application server may be experiencing an incident and may send incident data to computing device 102. Notification management module 104 on computing device 102 may process the incident data to determine that notifications for the incident should be suppressed until the end of a particular notification suppression window. Upon the termination of the notification suppression window, notification management module 104 of computing device 102 may send event notifications back to the application server, which displays them to the IT professional.

The notification management system may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant (PDA).

3. Managing Flapping Incident Notifications

Figure 2:
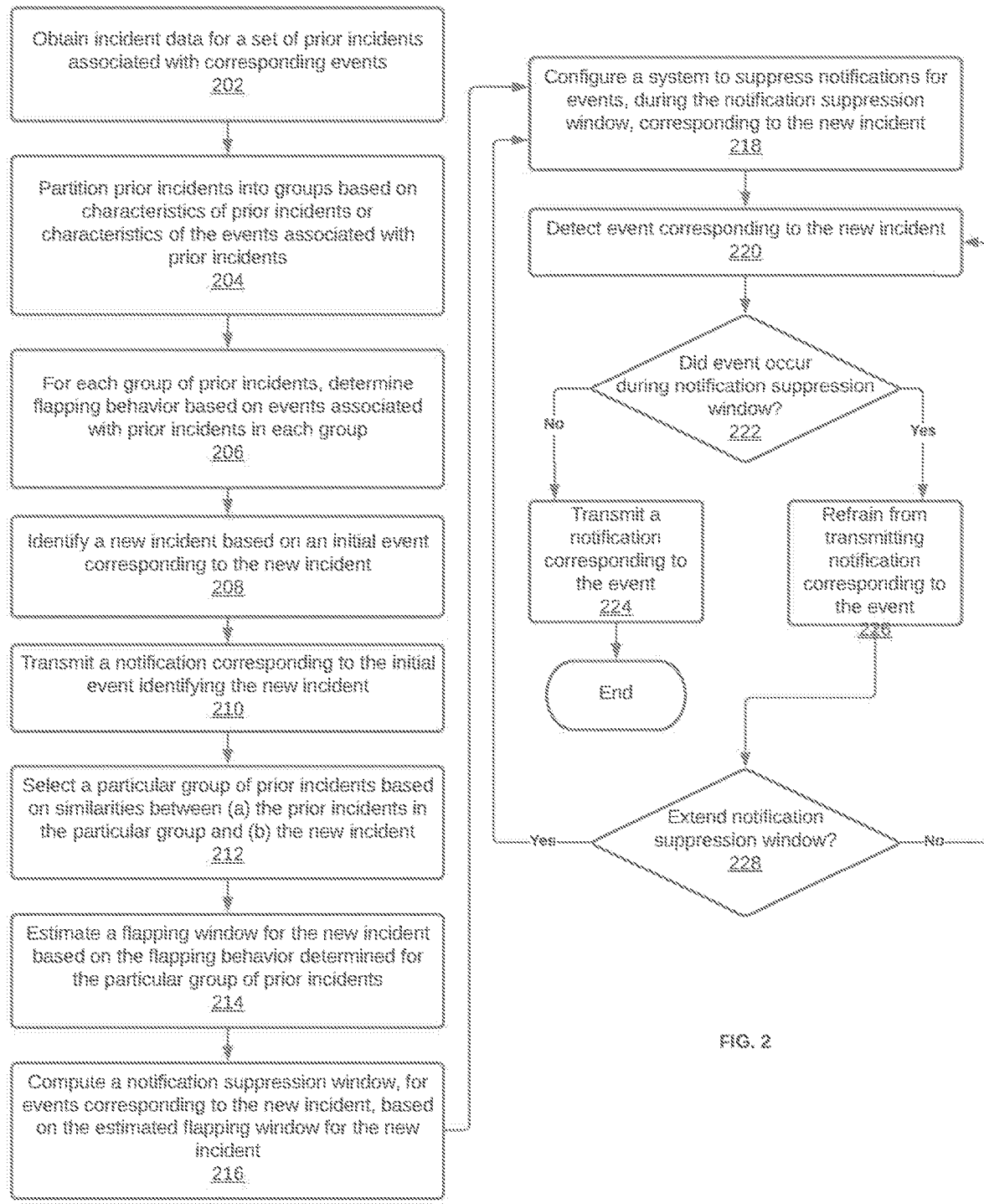
FIGS. 2 and 3 illustrate example sets of operations for estimating a flapping window for an incident, in accordance with one or more embodiments.

FIG. 2 illustrates an example set of operations for suppressing notifications based on estimated flapping windows, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments obtain incident data for a set of prior incidents associated with corresponding events (Operation 202). The incident data may be obtained on a continuous or periodic basis. The incident data may be obtained in response to transmitting a request for the incident data. The incident data may be obtained for a period of time that matches a seasonality pattern such as incident data for the last day of the month, or incident data for days when severe weather was detected. Incident data may correspond to scheduled maintenance periods or periodically scheduled scans. Incident data may correspond to a period of time associated with specific business events. In another example, the system maintains incident data for the last n days. As the age of the incident data exceeds n days, the incident data is discarded. Obtaining incident data may include obtaining incident data currently maintained by the system.

One or more embodiments partition incident data/prior incidents into groups based on the characteristics of the prior incidents (Operation 204). Incident characteristics include any attributes about an incident included in the incident data. As examples, the incident characteristics may include a type of effected component, a type of incident itself, a severity of incident, or a date/time of an incident. Incidents may be grouped together based further on seasonality patterns (for example, incidents occurring on Fridays, incidents occurring on weekends, incidents occurring during tax season, or incidents occurring during the last quarter of the year).

In an embodiment, the data for each incident is used to generate a feature vector. A clustering algorithm is executed on the feature vectors to partition the feature vectors in separate clusters. Thereafter, prior incidents, corresponding to feature vectors that are clustered together, are grouped into groups.

In related embodiments, the system may identify patterns in prior incidents for purposes of grouping the prior incidents. Certain incidents may occur in relation to or as a result of certain scheduled operations. For example, certain incidents (e.g., data storage overload, message queue clogs, software errors) may occur during or soon after a major product release or system upgrade. In such cases or other similar cases, notification management module 104 may be configured to analyze specific incident attributes of an incident rather than all incident attributes to determine similarity between prior incidents and a target incident. For example, a particular attribute of some or all incidents may indicate whether the incident is occurring during a certain operation (e.g., application update process, software patching process etc.). Notification management agent may be configured to check the value of that particular attribute in event data for the target incident rather than other incident attributes or before checking other incident attributes. If the particular attribute's value corresponds to a certain operation, notification management agent may be configured to specifically search for prior incidents that also indicate a same or similar value for the particular attribute. By focusing on specific incident attributes, notification management agent may be configured to more efficiently identify prior incidents that are similar to the target incident.

In an embodiment, the system identifies a new incident based on the detection of an initial event corresponding to the new incident (Operation 208). The system may subscribe to an event stream that includes events associated with incidents. The event stream may be published by an incident data source, as described above. Upon detecting the event, the system computes an event signature (for example, a hash value) based on the attributes of the event. The system then determines that the event signature does not match a current and/or recent incident. As a result, the event signature is determined to correspond to an initial event for a new incident.

An initial event corresponding to an incident may indicate that the incident is an unresolved state, may indicate that user or administrator attention is required to address the incident. The initial event may include information about the status of the incident and/or recommended actions corresponding to the incident. The system publishes the status of the new incident via a notification corresponding to the initial event (Operation 210). The system transmits the notification to one or more notification targets that may include functionality to address the new incident, or initiate remediation operations.

The system then initializes a process to suppress further notifications corresponding to the new incident based on whether the new incident is expected to flap back and forth between different states. The system estimates whether and for how long the new incident is expected to flap back and forth between different states. The system first identifies a particular group of prior incidents based on similarities between (a) the prior incidents in the particular group and (b) the new incident (Operation 212). In one example, the system computes n-dimensional planes that respectively represent groups of prior incidents. The system further computes a feature vector for the new incident that can be represented in an n-dimensional space. A particular group of prior incidents, represented by an n-dimensional plane with a shortest Euclidean distance to the feature vector for the new incident, is selected. The system may further require that the Euclidean distance is less than a threshold value to be selected in Operation 212. In another example, the system may compute a similarity score between the new incident and each incident in groups of incidents. An overall similarity score may then be determined as a function of each of the similarity scores computed respectively for the incidents in each group. The group with the highest similarity score, that meets a similarity threshold is selected.

In an embodiment, the system estimates a flapping window for the new incident based on the flapping behavior determined for the selected group of prior incidents (Operation 214). The flapping behavior determined for the selected group of prior incidents is based on flapping windows corresponding respectively to the prior incidents. In an example, a flapping window may be defined as a period of time, from an initial detection of an incident to a final resolution of an incident, during which the event repeatedly flapped between a resolved and unresolved state. Alternatively, or in addition, a flapping window may further require that any particular event is a part of a same flapping window as a preceding event as long as the particular event occurred within n minutes of the preceding event. Once n minutes have passed after an event, without the detection of a new event, the flapping window is classified as terminated. Different definitions of a flapping window may correspond to different requirements re frequency of events, time between events, etc.

The characteristics of the flapping windows of the incidents in the selected group are used to determine a flapping behavior. As an example, the system may determine that on average, incidents in the group flap for ten minutes after initial detection and furthermore, flapping events are detected within two minutes of the prior event. The flapping behavior for the selected group is used to define an estimated flapping window for the new incident (Operation 214). Continuing the above example, the initial flapping window may be determined to be ten minutes. Alternatively, the initial flapping window may be determined to be only two minutes, and furthermore extended whenever any event is detected (a) within a current flapping window and (b) in less than two minutes since to the last detected event. The extension may increase the estimated flapping window up to a point-in-time that is two minutes subsequent to the latest event that was detected during the estimated flapping window. In yet another example, the initial flapping window may be estimated as ten minutes. Any new events detected after minute nine and within a current flapping window result in extending the flapping window to a point-in-time that is one minute subsequent to the detected event. As can be appreciated by any person skilled in the art, a definition of a flapping window can vary from implementation to implementation. Furthermore, a function to generate the estimated flapping window for a new incident based on flapping behavior of prior incidents can vary from implementation to implementation.

In an embodiment, a machine learning model is used to compute an estimated flapping window for a new incident. The training and application of a machine learning model are described below with reference to FIG. 3.

In an embodiment, the system computes a notification suppression window, for events corresponding to the new incident, based on the estimated flapping window for the new incident (Operation 216). The system is configured to suppress notifications for events, occurring during the notification suppression window, corresponding to the new incident (Operation 218).

The system may compute the notification suppression window such that the notification suppression window matches the estimated flapping window. The system may also extend the notification suppression window such that the notification suppression window matches extensions to the estimated flapping window.

In an example, the system identifies an estimated flapping window for an incident that starts from the initial event detecting the incident and terminates ten minutes thereafter. The notification suppression window is computed to match the estimated flapping window. Accordingly, the notification suppression window includes ten minutes beginning from the initial event detecting the incident to ten minutes thereafter.

Alternatively, the parameters of the estimated flapping window may be applied to a function to compute a notification suppression window that differs from the estimated flapping window by at least one configuration parameter (e.g., initial configuration, conditions for extensions, durations of extensions, and maximum duration). As an example, the notification suppression window may be computed to terminate one-minute subsequent to or one-minute prior to the termination of the estimated flapping window. The notification suppression window may be extended using the same or different set of rules used to extend to estimated flapping window. The notification suppression window may be computed such that the notification suppression window only begins after n number of notifications have been transmitted in association with the incident. In an example, the notification suppression window is computed such that the notification suppression window begins after three notifications (e.g., unresolved state, resolved state, and unresolved state) have been transmitted. The same notification suppression window once initiated, may be terminated at the same time that the estimated flapping window for the incident is estimated to terminate. In another example, the extensions for the notification suppression window may not extend the notification suppression window beyond a maximum duration. Accordingly, even if the estimated flapping window is extended since the incident is expected to flap longer beyond the current estimated flapping window, the notification suppression window may not be extended beyond the maximum duration configured for the notification suppression window. As described above, the notification suppression window may be computed based at least in part on an estimated flapping window. Alternatively, or in addition, the notification suppression window may be computed without the use of an estimated flapping window. The notification suppression window may be computed based on any attributes of an incident. As an example, the notification suppression window may be computed based on an amount of time typically taken by an administrator to address the incident. In another example, the notification suppression window may be computed based on a severity of the incident. The notification suppression window for an incident may be computed based on other environmental factors external to the incident. In an example, the notification suppression window may be computed in proportion to a queue of tasks for an administrator. The system computes the notification suppression window such that the longer the queue of tasks for an administrator, the longer the notification suppression window.

Once the notification suppression window is configured, the notification suppression window may be used to determine when to suppress notifications corresponding to events associated with the new incident. When a new event corresponding to the new incident is detected (Operation 220), a determination is made as to whether the event occurred within or outside of a notification suppression window (Operation 222). If the event occurred outside of a notification suppression window, then the notification is transmitted to a notification target (Operation 224). As an example, the system may transmit communication asynchronously that includes the notification. The notification may be transmitted as an email message, a text, or a pop-up message for a user. The notification may be transmitted by invoking an Application Programming Interface (API). The notification may be transmitted in a notification stream to subscribed users and/or application processes.

If the event occurred during a notification suppression window, the system refrains from transmitting a notification corresponding to the event (Operation 226). The system may however generate a log that stores the events and/or the notifications. The stored notifications, that are not transmitted to the notification targets, may be available for off-line review, for example, during an audit. The system determines whether to extend the notification suppression window (Operation 228) based at least in part on whether the estimated flapping window for the new incident has been extended. As stated above, a maximum duration configured for the notification suppression window may restrict extensions for the notification suppression window.

Figure 3:
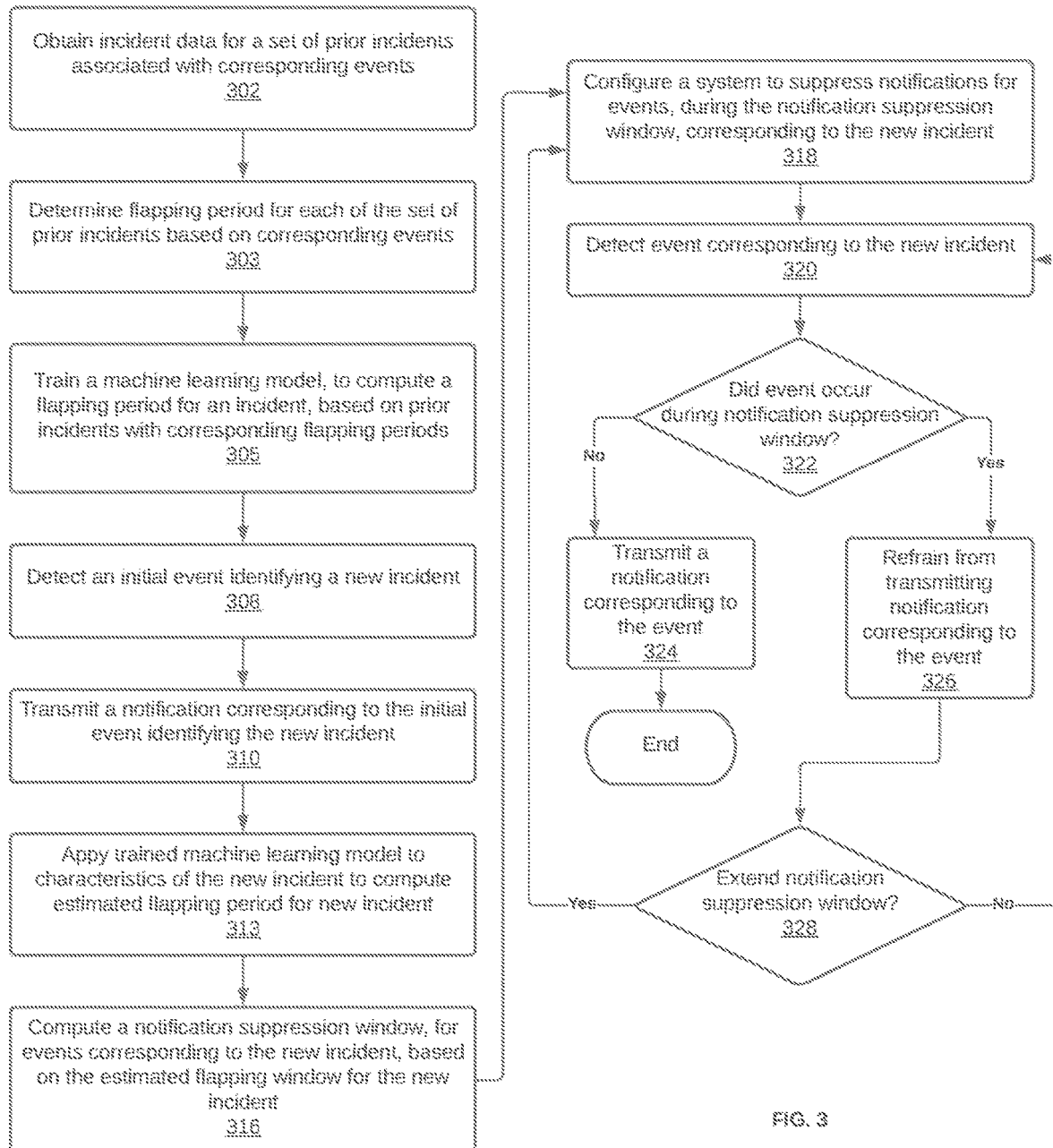

FIG. 3 illustrates an example set of operations for using a machine learning model to compute estimated flapping windows, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

One or more embodiments obtain incident data for a set of prior incidents associated with corresponding events (Operation 302). Operation 302 is similar to Operation 202, described above.

The incident data identifies the attributes of each incident. As stated above, examples of incident attributes may include, but are not limited to, a type of the incident, the type of component(s) affected by the incident, the cause of the incident, the time/date of the incident, a number and/or type of factors that cause the incident, and the severity of the incident. Incident attributes may further include information about remediation actions associated with the incident. As an example, incident attributes may indicate the number of people or resources that are attempting to fix the incident.

The system uses the events, corresponding to each incident, to determine a flapping period for each prior incident (Operation 303). The flapping period, determined for a prior incident, is defined as a set of parameters of the flapping period. The attributes may include, for example, a duration of the flapping period, an average time between events detected during the flapping period, a maximum time between events detected during the flapping period, and a frequency of events during the flapping period.

In an embodiment, the system trains a machine learning model (Operation 305) based on a training set that includes (a) attributes of events and (b) flapping period corresponding to the prior incidents. A machine learning algorithm is applied to the training set to generate a trained machine learning model that predicts flapping periods for any new incident based on the characteristics of the new incident. Examples of machine learning algorithm include regression algorithms, instance-based algorithms, regularization algorithms, decision tree algorithms, Bayesian algorithms, clustering algorithms, association rule learning algorithms, artificial neural network (ANN) algorithms, deep learning algorithms, dimensionality reduction algorithms, and ensemble algorithms.

When an initial event identifying a new incident is detected (Operation 308), the system transmits a notification corresponding to the initial event identifying the new incident (Operation 310). Operations 308 and 310 are similar to operations 208 and 210 described above.

Furthermore, the system applies the trained machine learning model to the characteristics of the new incident to compute the estimated flapping period for the new incident (Operation 313). In an example, the characteristics of the new incident are used to generate a feature vector. The feature vector includes a set of values that is applied to the trained machine learning model, such as a neural network. Based on the values, representing the characteristics of the new incident, the trained machine learning model predicts the parameters of the flapping period estimated for the new incident. Once the estimated flapping period has been estimated for the new incident, the process continues as illustrated in operations 316 to 328. Operations 316 to 328 being similar to respective operations 216 to 228 described above.

4. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a liquid crystal display (LCD), plasma display, electronic ink display, cathode ray tube (CRT) monitor, or any other kind of device for displaying information to a computer user. An input device 414, including alphanumeric and other keys, may be coupled to bus 402 for communicating information and command selections to processor 404. Alternatively, or in addition, the computer system 400 may receive user input via a cursor control 416, such as a mouse, a trackball, a trackpad, a touchscreen, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. The display 412 may be configured to receive user input via one or more pressure-sensitive sensors, multi-touch sensors, and/or gesture sensors. Alternatively, or in addition, the computer system 400 may receive user input via a microphone, video camera, and/or some other kind of user input device (not shown).

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 400 can receive the data from the network and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 440 might transmit a requested code for an application program through Internet 428, ISP 426, local network 422 and communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    identifying a plurality of flapping events associated with at least one prior incident,
        wherein each of the plurality of flapping events indicate whether the at least one prior incident is in a resolved state or an unresolved state;
    based on a time corresponding to each of the plurality of flapping events associated with the at least one prior incident, computing an estimated flapping window for any incident that meets one or more similarity criteria with the at least one prior incident,
        wherein the estimated flapping window corresponds to a period of time during which a likelihood of said any incident flapping between a resolved state and an unresolved state exceeds a threshold value;
    subsequent to detecting a first event corresponding to a target incident:
        transmitting a first notification associated with the target incident based on the first event;
        determining that the target incident meets the similarity criteria with the at least one prior incident;
        computing a notification suppression window for the target incident based on the estimated flapping window;
        initiating the notification suppression window for the target incident;
    subsequent to detecting a second event corresponding to the target incident:
        determining that the notification suppression window for the target incident has not terminated;
        refraining from transmitting any notification for the target incident based on the second event responsive to determining that the notification suppression window for the target incident has not terminated;
    subsequent to detecting a third event corresponding to the target incident:
        determining that the notification suppression window for the target incident has terminated;
        transmitting a second notification associated with the target incident based on the third event responsive to determining that the notification suppression window for the target incident has terminated.

2. The medium of claim 1, wherein computing the estimated flapping window comprises:
    identifying a period of time between the initial detection of the at least one prior incident and the final resolution of the at least one prior incident; and
    computing the estimated flapping window based at least in part on the period of time between the initial detection of the at least prior incident and the final resolution of the at least one prior incident.

3. The medium of claim 1, wherein computing the estimated flapping window comprises:
    identifying a period of time between each of the plurality of flapping events associated with the at least one prior incident; and
    computing the estimated flapping window based at least in part on the period of time between each of the plurality of flapping events associated with the at least one prior incident.

4. The medium of claim 1, wherein computing the notification suppression window comprises one or more of:
    computing an initial size of the notification suppression window;
    computing a start time and an end time of the notification suppression window based on the initial size, and a time at which the first event was detected;
    computing a size of an extension period for extending the notification suppression window based on events, associated with the target incident, that are detected prior to the termination of the notification suppression window;
    computing a maximum size of the notification suppression window such that an extension period for extending the notification suppression window cannot extend the notification suppression window beyond the maximum size of the notification suppression window.

5. The medium of claim 1, wherein the operations further comprise:
    re-computing the estimated flapping window to generate an updated estimated flapping window for any incident that meets the similarity criteria with the at least one prior incident based at least on a second plurality of flapping events associated with the target incident;
    computing a second notification suppression window for a second incident based on the updated estimated flapping window.

6. A non-transitory computer readable medium comprising instructions which, when executed by one or more hardware processors, causes performance of operations comprising:
    training a machine learning model to determine an estimated flapping window for any incident that meets one or more similarity criteria with a set of prior incidents, the training comprising:
    obtaining training data sets, each training data set of historical data comprising:
    attributes of at least one prior incident;
    events associated with the at least one prior incident, wherein the events indicate (a) an event time and (b) whether the at least one prior incident is in a resolved state or an unresolved state;
    training the machine learning model based on the training data sets; and
    applying the machine learning model to attributes of the target incident to determine an estimated flapping window for the target incident;

computing a notification suppression window for the target incident based on the estimated flapping window.

7. A non-transitory computer readable medium comprising instructions which, when executed by one or more hardware processors, causes performance of operations comprising:
   receiving first event data for a first event of a target incident;
   responsive to receiving the first event data, estimating a flapping window for the target incident, based on a time corresponding to each of a plurality of flapping events associated with at least one prior incident that meets one or more similarity criteria with the target incident, wherein the plurality of flapping events indicate whether the at least one prior incident is in a resolved state or an unresolved state;
   receiving second event data for a second event of the target incident; and
   determining whether the second event occurred within the estimated flapping window, further comprising:
      if the second event occurred within the estimated flapping window, suppressing a notification for the second event; and
      if the second event did not occur within the estimated flapping window, sending the notification for the second event.

8. The non-transitory computer readable medium of claim 7, wherein the operations further comprise:
   sending a first notification for the first event; and
   suppressing subsequent notifications for events of the target incident and resolution of events of the target incident during the flapping window.

* * * * *